US010037220B2

(12) United States Patent
Amulothu et al.

(10) Patent No.: US 10,037,220 B2
(45) Date of Patent: Jul. 31, 2018

(54) FACILITATING SOFTWARE-DEFINED NETWORKING COMMUNICATIONS IN A CONTAINER-BASED NETWORKED COMPUTING ENVIRONMENT

(71) Applicant: International Business Machines Corporation, Armonk, NY (US)

(72) Inventors: Venkata S. Amulothu, Plano, TX (US); Ashish Kapur, Santa Clara, CA (US); Vishal Shukla, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 14/946,948

(22) Filed: Nov. 20, 2015

(65) Prior Publication Data
US 2017/0149843 A1 May 25, 2017

(51) Int. Cl.
G06F 9/00 (2006.01)
G06F 9/455 (2018.01)
H04L 29/06 (2006.01)

(52) U.S. Cl.
CPC ........ *G06F 9/45558* (2013.01); *H04L 63/083* (2013.01); *G06F 2009/45595* (2013.01)

(58) Field of Classification Search
CPC .................... H04L 65/1069; G06F 9/45558
See application file for complete search history.

(56) References Cited

U.S. PATENT DOCUMENTS

| 9,038,151 | B1* | 5/2015 | Chua | ...................... H04L 45/02 709/223 |
| 2016/0182567 | A1* | 6/2016 | Sood | ...................... H04L 63/20 726/1 |
| 2016/0301779 | A1* | 10/2016 | Cui | ......................... H04L 45/308 |
| 2017/0063927 | A1* | 3/2017 | Schultz | ................... H04L 63/20 |

FOREIGN PATENT DOCUMENTS

WO 2015/031866 A1 3/2015

OTHER PUBLICATIONS http://www.nuagenetworks.net/wp-content/uploads/2014/11/2013-04-Packet_Pushers_Nuage_Networks-final.pdf by Greg Ferro, Mar. 16, 2015, p. 4.*

(Continued)

*Primary Examiner* — Alexander Lagor
*Assistant Examiner* — Syed M Ahsan
(74) *Attorney, Agent, or Firm* — William H. Hartwell; Hunter E. Webb; Keohane & D'Alessandro PLLC

(57) ABSTRACT

Aspects of the present invention provide an approach for facilitating a software-defined networking (SDN) communication in a container-based networked computing environment. In an embodiment, a SDN policy agent is created in the container-based networked computing environment. This SDN policy agent is created as a container virtual machine (VM) in the container-based networked computing environment. When a request is made by a VM to establish a SDN connection with the SDN controller for the server, the SDN controller forwards the request to the SDN policy agent. The SDN policy agent is responsible for determining (Continued)

whether the VM is eligible to establish the connection. If the SDN policy agent determines that the VM is eligible, the VM is allowed to become part of the SDN network.

15 Claims, 9 Drawing Sheets

(56) References Cited

OTHER PUBLICATIONS

Williams, "Docker Containers Need Security?", http://www.nuagenetworks.net/blog/docker-containers-require-sdn-security/, Jan. 12, 2015, 5 pages.
Ball, "How to Network Docker Containers with Weave", Sep. 14, 2014, Cloud Zone, 3 pages.
"Docker with OpenContrail", OpenContrail Blog, Sep. 20, 2014, 4 pages.

* cited by examiner

FACILITATING SOFTWARE-DEFINED NETWORKING COMMUNICATIONS IN A CONTAINER-BASED NETWORKED COMPUTING ENVIRONMENT

TECHNICAL FIELD

The subject matter of this invention relates generally to network communications. More specifically, aspects of the present invention provide a solution for improved software-defined networking (SDN) communications in a container-based networked computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Providers in the networked computing environment often deliver services online via a remote server, which can be accessed via a web service and/or software, such as a web browser. Individual clients can run virtual machines (VMs) that utilize these services and store the data in the networked computing environment. This can allow a single physical server to host and/or run many VMs simultaneously.

However, the many VMs can sometimes provide challenges for the hardware on which they operate. For example, if a large number of VMs were simultaneously to utilize the hardware controller of a physical server that facilitates communications with the outside network, the controller might be overwhelmed. To remedy this problem, solutions have been developed. One such solution is software-defined networking (SDN). SDN virtualizes network communications so that hardware devices are not utilized directly by individual VMs, allowing multiple VMs to create a network.

SUMMARY

In general, aspects of the present invention provide an approach for facilitating a software-defined networking (SDN) communication in a container-based networked computing environment. In an embodiment, a SDN policy agent is created in the container-based networked computing environment. This SDN policy agent is created as a container virtual machine (VM) in the container-based networked computing environment. When a request is made by a VM to establish a SDN connection with the SDN controller for the server, the SDN controller forwards the request to the SDN policy agent. The SDN policy agent is responsible for determining whether the VM is eligible to establish the connection. If the SDN policy agent determines that the VM is eligible, the VM is allowed to become part of the SDN network.

A first aspect of the invention provides a method for facilitating a software-defined networking (SDN) communication in a container-based networked computing environment, comprising: creating a SDN policy agent in the container-based networked computing environment, the SDN policy agent being a container virtual machine (VM) that provides SDN communications to other VMs in the container-based networked computing environment; forwarding, in response to a request by a VM in the container-based networked computing environment to establish a SDN connection with a SDN controller, an authentication request to the SDN policy agent; determining, by the SDN policy agent, whether the VM is eligible to establish the connection; and establishing, by the SDN policy agent, the connection between the VM and the SDN controller in response to a determination that the VM is eligible.

A second aspect of the invention provides a system for facilitating a software-defined networking (SDN) communication, comprising: a physical server having an operating system; a plurality of containers running on the physical server, each container of the plurality of containers being a virtual machine (VM) running on the operating system; a communications port that connects the physical server to a network; a SDN controller, configured to: forward, in response to a request by a VM in one of the plurality of containers to establish a connection with the SDN controller, an authentication request; and provide, in response to the authentication request being approved, a virtualized network connection between the VM and the communications port; and a SDN policy agent, the SDN policy agent being a container virtual machine (VM) that provides SDN communications to other VMs in the plurality of containers on the physical server and configured to: obtain the authentication request sent by the SDN controller; determine whether the VM is eligible to establish the connection; and establish the connection between the VM and the SDN controller in response to a determination that the VM is eligible.

A third aspect of the invention provides a computer program product embodied in a computer readable medium that, when executed by a computer device, performs a method for facilitating a software-defined networking (SDN) communication in a container-based networked computing environment, the method comprising: creating a SDN policy agent in the container-based networked computing environment, the SDN policy agent being a container virtual machine (VM) that provides SDN communications to other VMs in the container-based networked computing environment; forwarding, in response to a request by a VM in the container-based networked computing environment to establish a SDN connection with an SDN controller, an authentication request to the SDN policy agent; determining, by the SDN policy agent, whether the VM is eligible to establish the connection; and establishing, by the SDN policy agent, the connection between the VM and the SDN controller in response to a determination that the VM is eligible.

A fourth aspect of the present invention provides a method for facilitating a software-defined networking (SDN) communication in a container-based networked computing environment, comprising: providing a computer infrastructure being operable to: create a SDN policy agent in the container-based networked computing environment, the SDN policy agent being a container virtual machine (VM) that provides SDN communications to other VMs in the container-based networked computing environment; forward, in response to a request by a VM in the container-based networked computing environment to establish a SDN connection with a SDN controller, an authentication request to the SDN policy agent; determine, by the SDN policy agent, whether the VM is eligible to establish the connection; and establish, by the SDN policy agent, the connection between the VM and the SDN controller in response to a determination that the VM is eligible.

Still yet, any of the components of the present invention could be deployed, managed, serviced, etc., by a service provider who offers to implement passive monitoring in a computer system.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
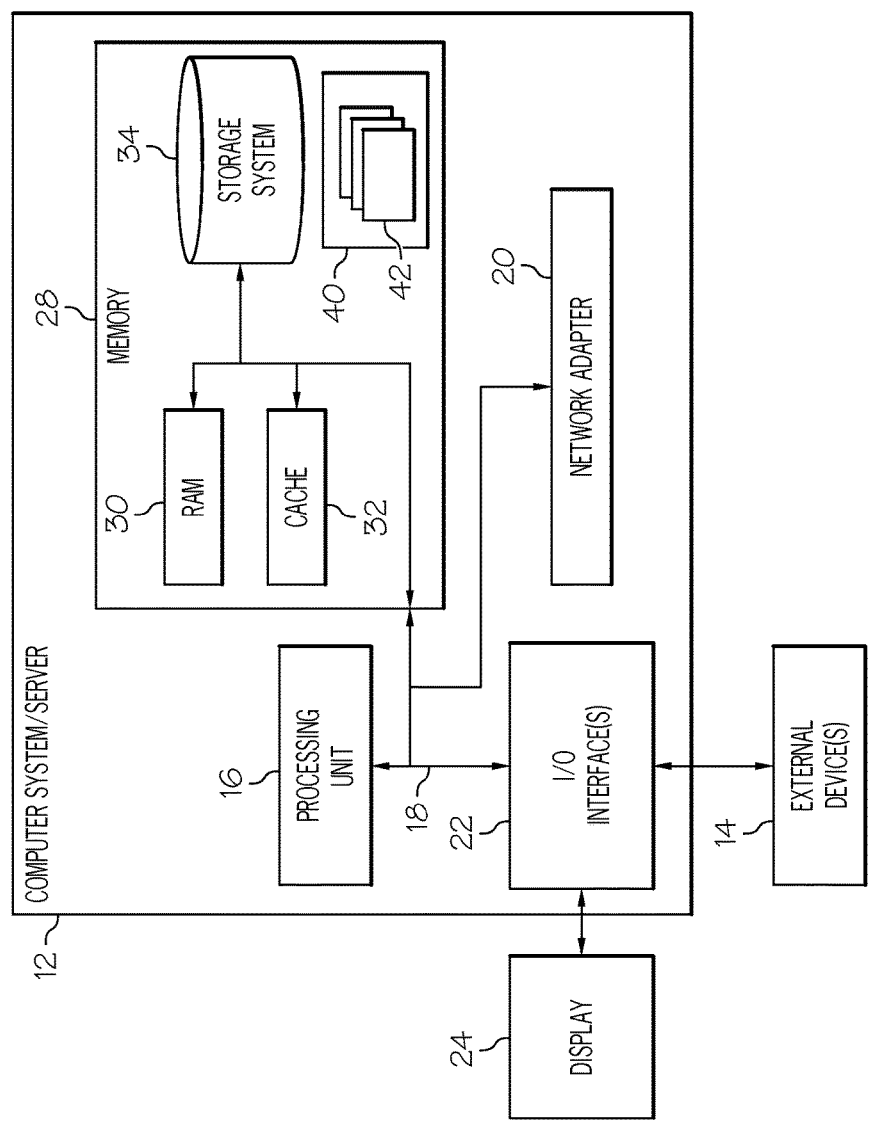
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for facilitating a software-defined networking (SDN) communication in a container-based networked computing environment. In an embodiment, a SDN policy agent is created in the container-based networked computing environment. This SDN policy agent is created as a container virtual machine (VM) in the container-based networked computing environment. When a request is made by a VM to establish a SDN connection with the SDN controller for the server, the SDN controller forwards the request to the SDN policy agent. The SDN policy agent is responsible for determining whether the VM is eligible to establish the connection. If the SDN policy agent determines that the VM is eligible, the VM is allowed to become part of the SDN network.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
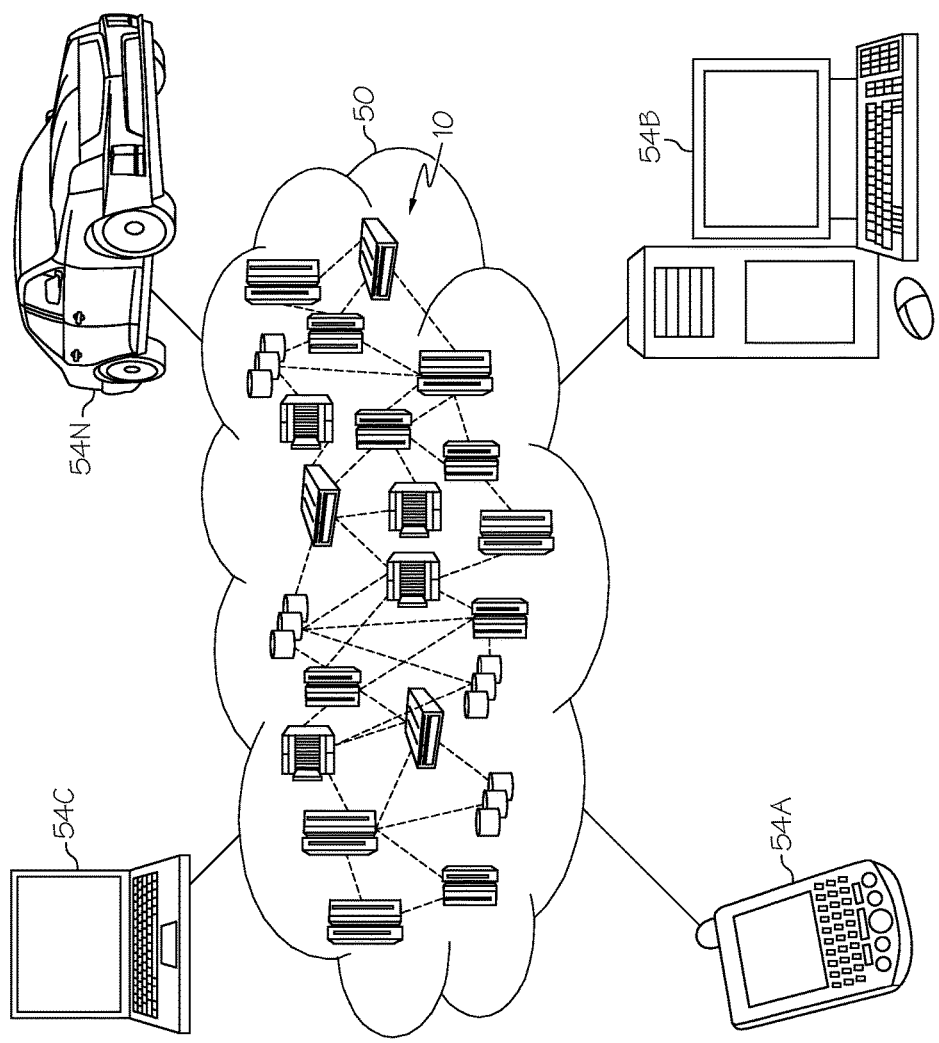
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
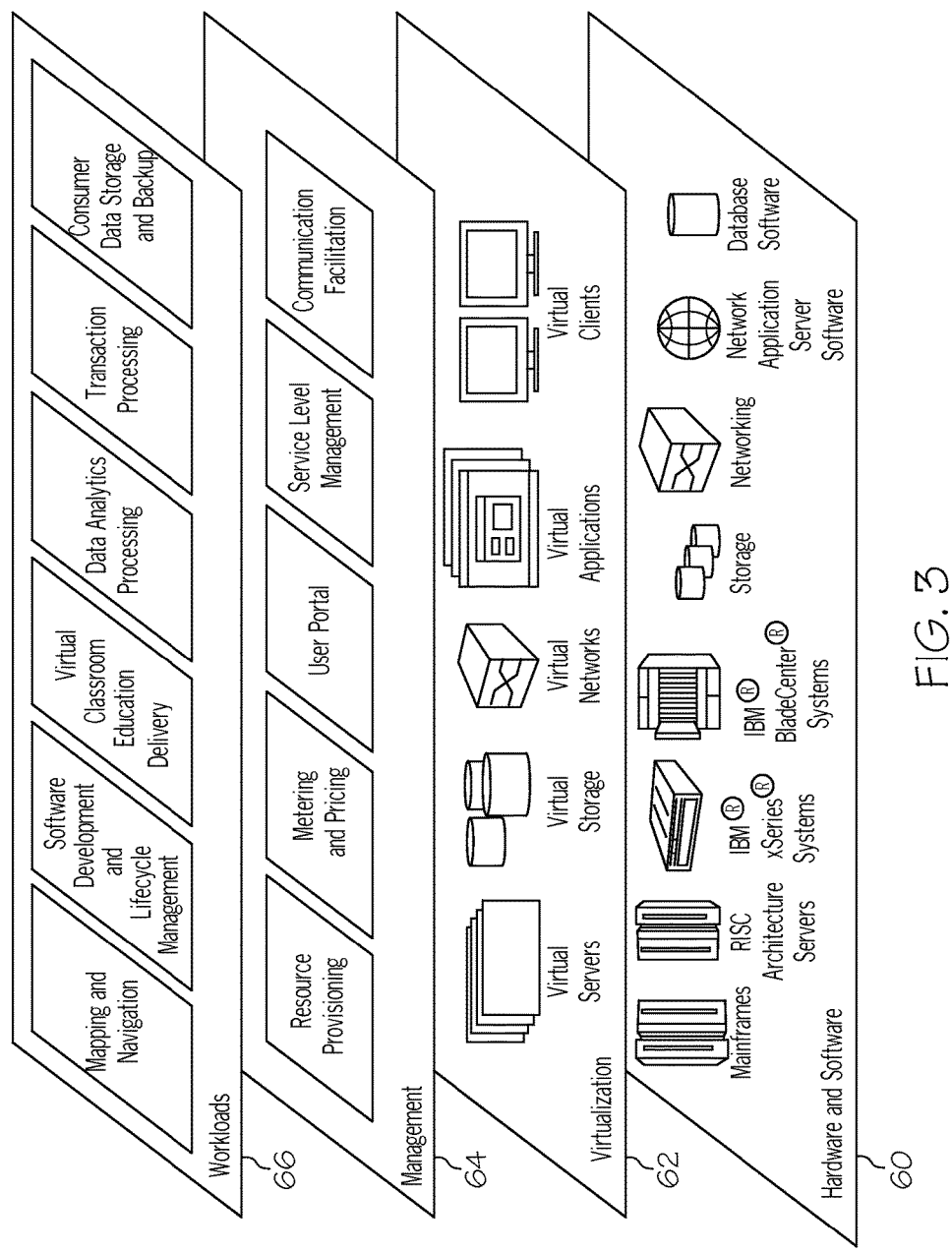
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is communication facilitation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the command identification functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
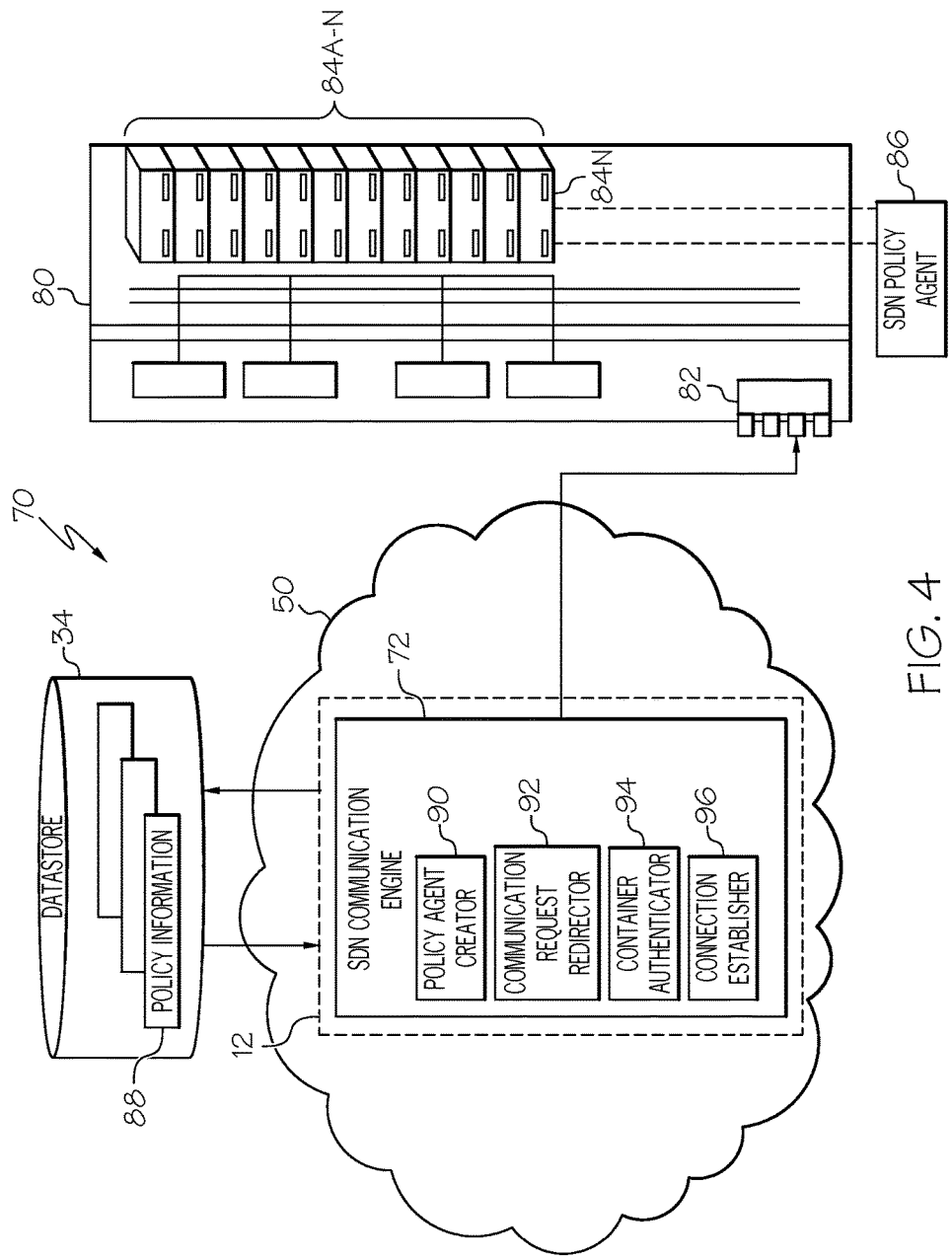
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 4 for illustrative purposes only. In the event the teachings recited herein are practiced in a networked computing environment 70, each physical server 80 need not have a SDN communication engine (hereinafter "system 72"). Rather, system 72 could be loaded on a server or server-capable device that communicates (e.g., wirelessly) with the physical server 80 to provide SDN communications therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for brevity purposes.

Along these lines, system 72 may perform multiple functions similar to a general-purpose computer. Specifically, among other functions, system 72 can facilitate a SDN communication in a container-based networked computing environment 70. To accomplish this, system 72 can include: a policy agent creator 90, communication request redirector 92, a container authenticator 94, and a connection establisher 96.

Figure 5:
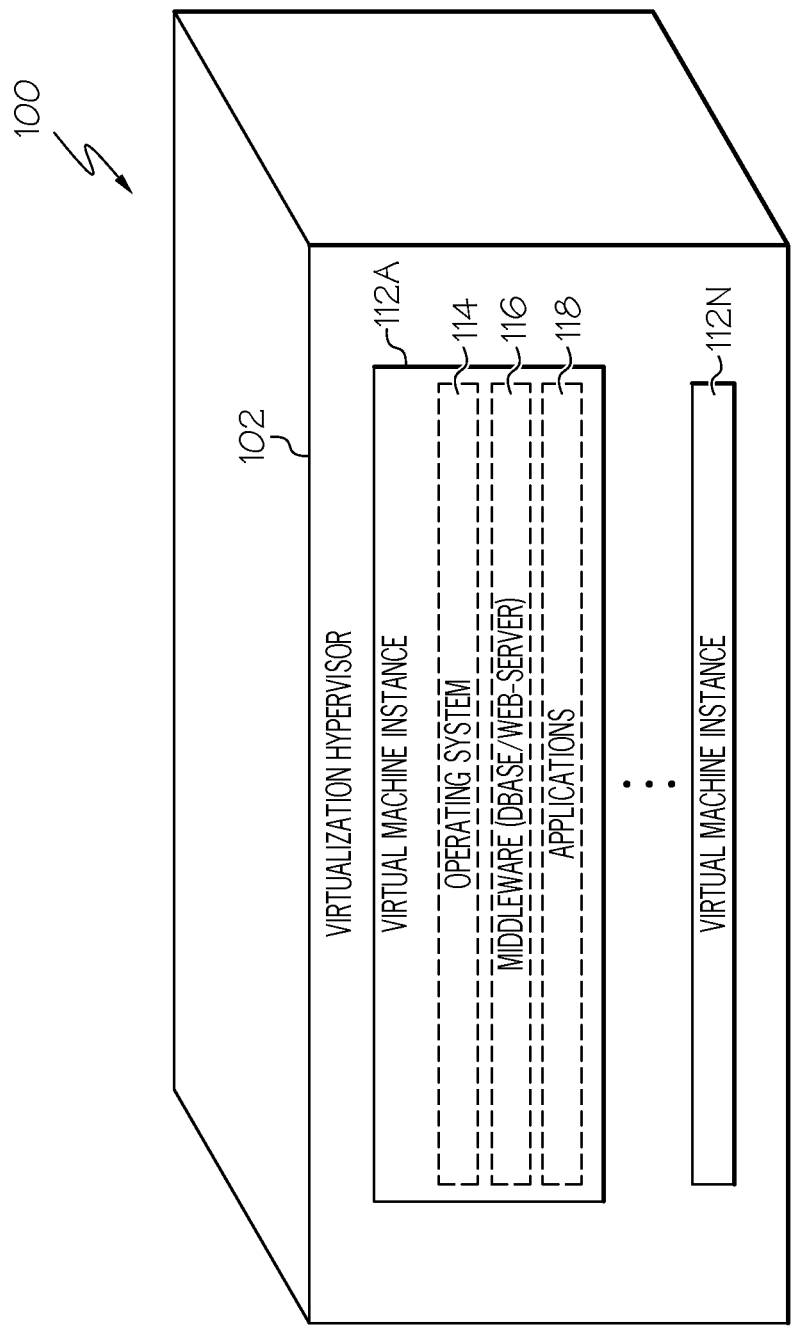
FIG. 5 depicts a traditional virtual machine instance according to an embodiment of the present invention.

Referring now to FIG. 5 in conjunction with FIG. 4, an example traditional virtual machine (VM) instance 100 according to an embodiment of the invention is shown. In an embodiment, VM instance 100 can be included in virtual server 84N on physical server 80. It should be understood that VM instance 100 is different from a process virtual machine. A process virtual machine is a platform dependent engine, such as a Java® Virtual Machine, that executes platform independent code written in a high-level programming language, such as Java, for performing a specific task (Java and Java Virtual Machine are trademarks of Oracle and/or its affiliates in the United States and/or elsewhere). In contrast, the VM instance 100 of the current invention is a virtual system that simulates an entire computing environment. To this extent, rather than performing only a single task, the VM instance 100 of the current invention is an environment within which a variety of tasks, functions, operations, etc., can be carried out by a user, such as by executing one or more applications thereon. As such, VM instance 100 can be made to simulate a stand-alone computer system in the eyes of a user.

To this extent, VM instance 100 includes a virtualization hypervisor 102 at the lowest level. Virtualization hypervisor 102 can run directly on the physical server 80, referred to as a bare metal (BM) configuration, or, alternatively, can run on a server operating system running on the physical server 80. In any case, virtualization hypervisor 102 provides a platform that allows multiple "guest" virtual server 84 systems to run concurrently on the physical server 80. To this extent, virtualization hypervisor 102 provides an abstraction level between the hardware level of physical server 80 and the higher level software functions of each virtual server 84A-N. In order to provide these software functions, each virtual server 84A-N can include a VM instance 112A-N, which can also be referred to as an image. VM instance 112A-N can contain a service offering that was initially provisioned to virtual server 84A-N and/or anything that has been later installed by a user. As such, software stack 112 can contain everything that is necessary to simulate a "guest" instance of a particular virtual server 84A-N on physical server 80 via virtualization hypervisor 102. To this extent, software stack 112 can provide an operating system 114, middleware 116, and/or one or more applications 118.

Figure 6:
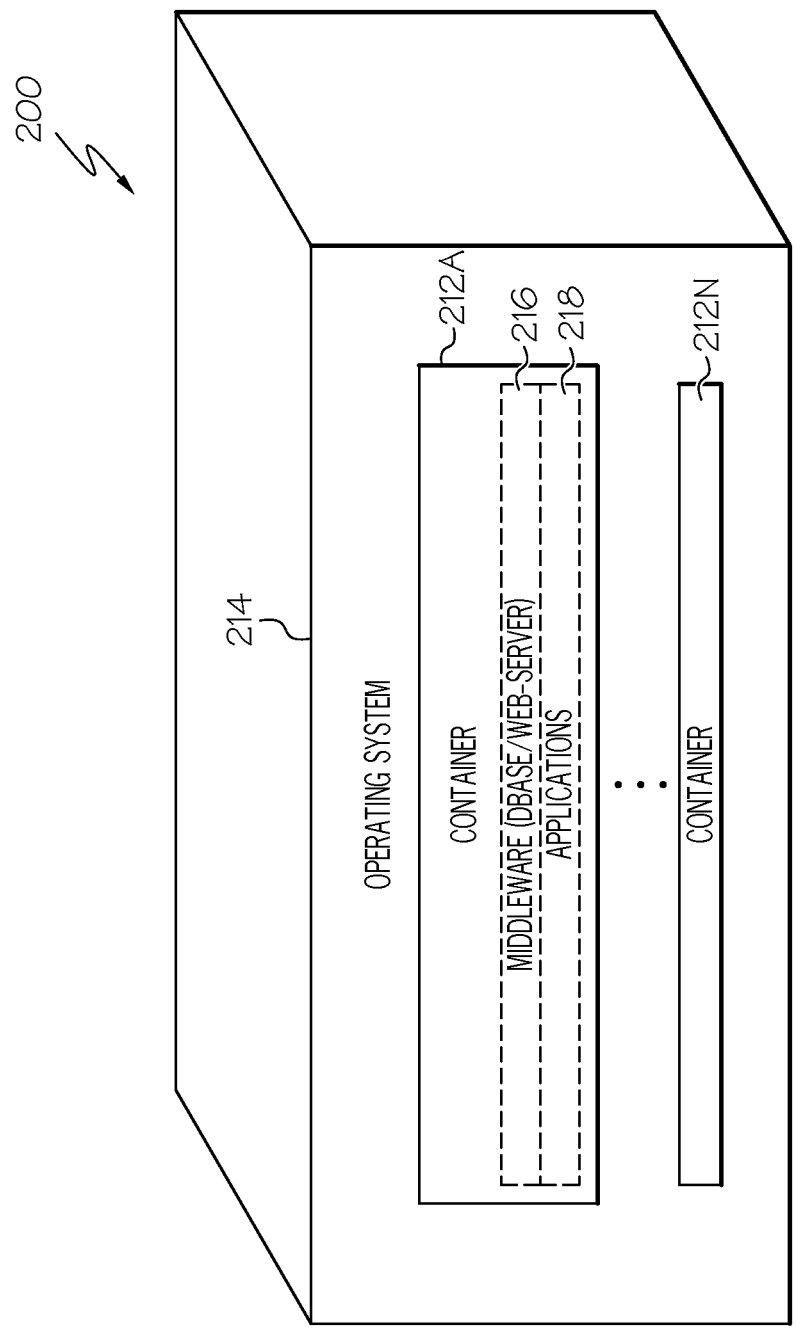
FIG. 6 depicts an example container-based virtual machine instance according to an embodiment of the present invention.

Referring now to FIG. 6 in conjunction with FIG. 4 and FIG. 5, an example container virtual machine (VM) environment 200 such as may be found in the container-based networked computing environment according to an embodiment of the invention is shown. In an embodiment, container environment 200 can be included in virtual server 84A-N on physical server 80. However, unlike with traditional VM instances 100, container environment 200 does not include a virtualization hypervisor 102 at the lowest level. Rather, in a container-based networked computing environment, an operating system 214 runs directly in a bare metal (BM) configuration on the physical server 80 and one or more containers 212A-N run on the same operating system 214. As with VM instance 100, containers 212A-N can each provide middleware 216, one or more applications 218, and, optionally, passive monitoring agent 120. However, because the operating system 214 is running in a BM configuration, no operating system need be included within the container 212A-N itself. This allows any container 212A-N to be made operational more quickly than a traditional hypervisor-based VM instance 100, while still maintaining the functional independence and other characteristics thereof.

As stated above, the large number of VMs running a single physical server 80 can sometimes provide challenges for hardware (e.g., a single physical server 80) on which they operate. For example, if a large number of VMs were simultaneously to try to directly utilize the hardware controller of the physical server that facilitates communications with the outside network, the controller might be overwhelmed. To remedy this problem, solutions have been developed. One such solution is software-defined networking (SDN). SDN virtualizes network communications so that hardware devices are not utilized directly by individual VMs, allowing multiple VMs to create a network.

The inventors of the invention described herein have discovered certain deficiencies in the current solutions for facilitating a SDN communication in a container-based networked computing environment. For example, in a traditional hypervisor-based VM environment, SDN is managed through the hypervisor, which has an agent residing in each hypervisor that can authenticate a VM before it connects to a SDN controller. However, the lack of a hypervisor in a container-based environment 200 makes this solution unworkable. Rather, the lack of an agent in such an environment can cause the SDN Controller to blindly process whatever request comes to it from any container and make it an end point in the network. With no authentication in place, the SDN controller can become vulnerable to denial of service (DOS) attack if a large number of containers are launched which are not supposed to be part of the SDN Networks. Also, as none of the processes performed by the SDN controller can be performed on the hosts which are hosting these controllers, managing the events on end points becomes difficult, and the control traffic to SDN controllers is increased.

Referring again to FIG. 4, policy agent creator 90 of system 72, as executed by computer system/server 12, is configured to create a SDN policy agent 86 in the container-based networked computing environment on physical server 80. SDN policy agent 86 is created as a container 84N that is that provides SDN communications to other VMs 84A-N in the container-based networked computing environment. In an embodiment, SDN policy agent 86 is dedicated to providing SDN communications to other VMs 84A-N in the container-based networked computing environment. To this extent, SDN policy agent 86 can be created using the same processes that are used to create any other container 84A-N in the container-based networked computing environment. As such, SDN policy agent 86 runs on the operating system like any other container 84A-N and has the same features of other containers 84A-N in terms of security, functional independence, etc. This allows SDN policy agent 86 to perform the SDN functions traditionally performed by the hypervisor from a container executing in the container-based networked computing environment on physical server 80 to facilitate communications between containers 84A-N and a physical communications port 82 on the physical server 80.

Figure 7:
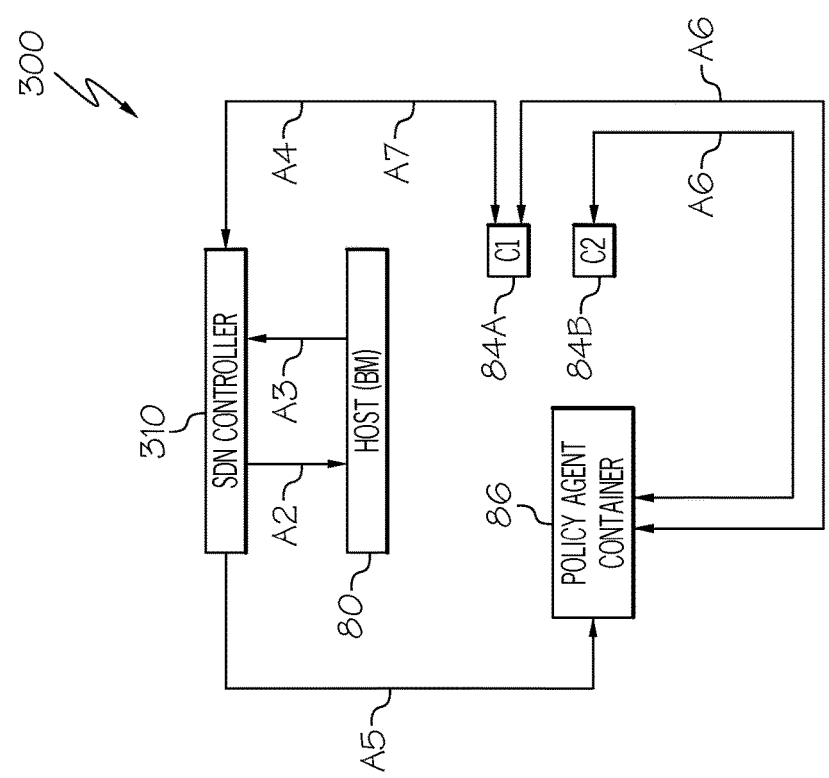
FIG. 7 depicts an example component diagram according to an embodiment of the present invention.
Figure 8:
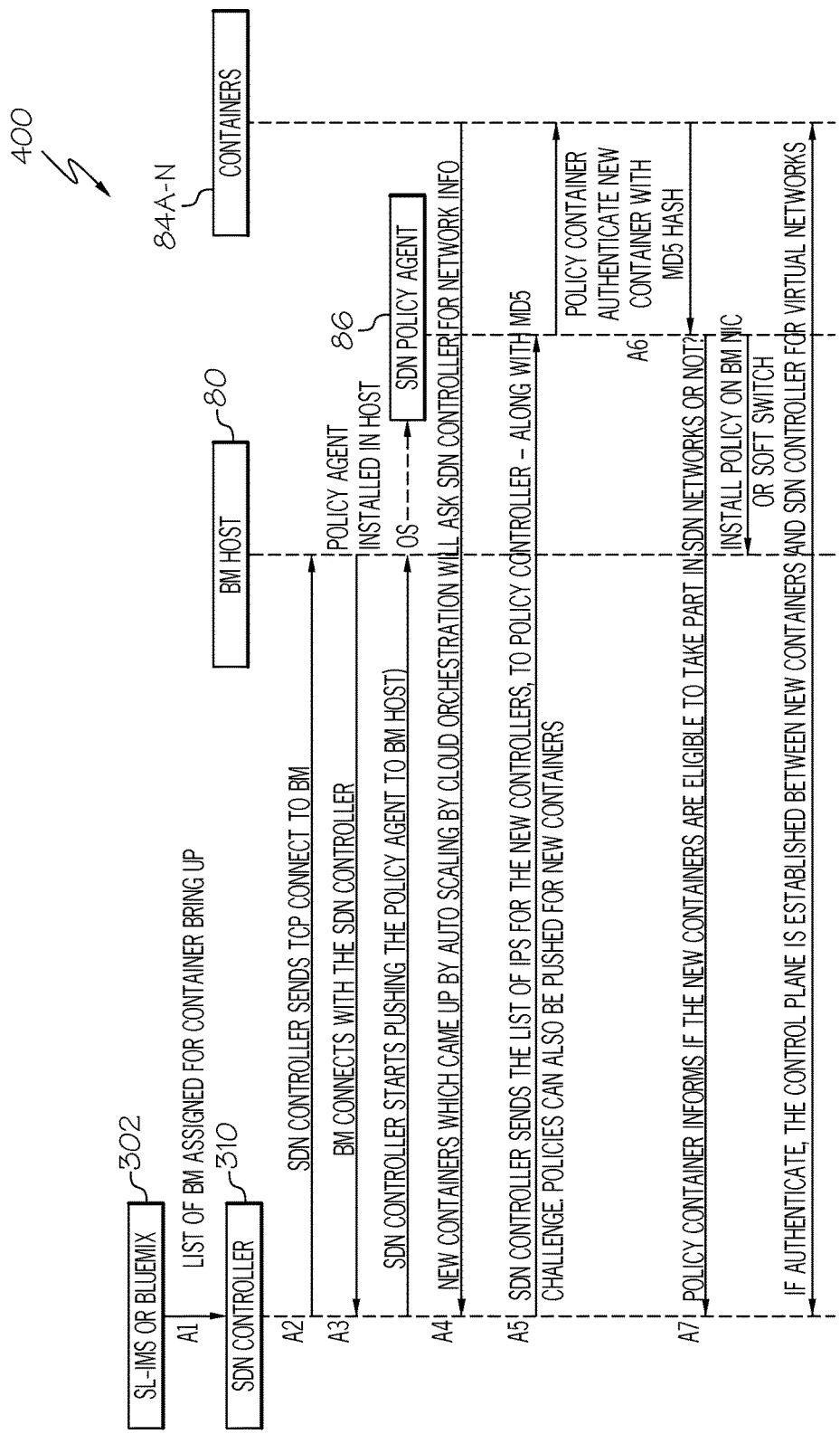
FIG. 8 depicts an example flow diagram according to an embodiment of the present invention.

Referring now to FIGS. 7 and 8, an example component diagram 300 and process flowchart 400 are shown according to embodiments of the invention. As shown, component diagram 300 and process flowchart 400 include a bare metal (BM) host 80 and a plurality of containers 84A-84B running on BM host 80. Additionally, component diagram 300 and process flowchart 400 include a SDN controller 310 on BM host 80 that controls communications performed by containers 84A-84B on BM host 308. Further, component diagram 300 and flow diagram 400 include policy agent container 86, which has been created as a container on the BM host 308. Process flowchart 400 also includes a Softlayer-infrastructure management system (SL-IMS) or IBM's BlueMix platform orchestration system 302.

Referring again to FIG. 4 in conjunction with FIGS. 7 and 8, to begin configuring the container-based networked computing environment to utilize SDN policy agent 86, SL-IMS or BlueMix 302 configures A1 SDN controller 310 with policy information 88 (e.g., retrieved from a datastore 34), including a list of the Internet Protocol (IP) addresses of the BM Host(s) 80 where container 84A-N will/can come up in process. The configured SDN controller 310 then establishes a connection with BM host(s) 80. In establishing the connection, SDN controller 310 sends a Transmission Control Protocol (TCP) connection request A2 to BM host 80, and BM host 80 establishes the connection with SDN controller 310.

Once the connection has been made, the SDN policy agent 86 can be created in the container-based networked computing environment by policy agent creator 90. In an embodiment, SDN controller 310 pushes A3, a predefined container 84N having SDN policy agent 86, to BM host 80, and SDN policy agent 86 is installed on BM host 80. SDN policy agent 86 has policy information 88 for any containers which can connect to the SDN Controller 310. This policy information 88 included in SDN policy agent 86 can include a list of IP addresses and passwords configured for newly made containers 84A-B, and can include an MD5 hash for the containers which are eligible to join. It should be understood, that these actions are not limited to an initiation process. Rather, SDN controller 310 can push policies to SDN policy agent 86 at any time.

Referring again to FIG. 4 in conjunction with FIGS. 7 and 8, communication request redirector 92 of system 72, as executed by computer system/server 12, is configured forward as an authentication request to SDN policy agent 86. Specifically, new containers C1 84A and C2 84B are created (e.g., from a predefined store) and assigned to the SDN network or, alternatively, existing containers C1 84A and C2 84B are newly assigned to the SDN network. These containers C1 84A and C2 84B will try to connect A4 with SDN controller 310 with existing methods. SDN controller 310 will forward A5 the challenge information associated with containers C1 84A and C2 84B to SDN policy agent 86. In an embodiment, the challenge information is forwarded to SDN policy agent as an encrypted challenge packet so that IP and/or password information is not sent as open information.

Whatever the case, SDN controller 310 can obtain the location of SDN policy agent 86 in using one of a number of solutions. For example, in an embodiment, a default address for the SDN policy agent 86 can be set in a virtual switch in the operating system of the container-based networked computing environment. In an embodiment, this default address can be set prior to the creation of SDN policy agent 86 by SDN controller 310. Then, the location of the SDN policy agent 86 can be established to be the default address in the virtual switch during the creation of SDN policy agent 86. Subsequently, when containers 84A-B request access to SDN controller 310, SDN controller 310 can access the virtual switch to retrieve the address for forwarding the request to SDN policy agent 86.

In an alternative embodiment, the address corresponding to the SDN policy agent 86 is inserted into a kernel of an operating system of the container-based networked computing environment during the creation of SDN policy agent 86. Subsequently, when containers 84A-B request access to SDN controller 310, SDN controller 310 can access the kernel to retrieve the address for forwarding the request to SDN policy agent 86. One solution for accomplishing this involves inserting the address into the kernel and/or accessing the address from the kernel using a hosting utility.

Referring again to FIG. 4 in conjunction with FIGS. 7 and 8, container authenticator 94 of system 72, as executed by computer system/server 12, is configured to determine whether containers C1 84A and C2 84B are eligible to establish the connection. This determination is made by the SDN policy agent 86 based on the challenge information sent by containers C1 84A and C2 84B to SDN controller 310 and forwarded by SDN controller 310 to SDN policy agent 86. In an embodiment, the challenge packet forwarded by SDN controller 310 is hashed by SDN policy agent 86 to obtain a password corresponding to the VMs C1 84A and C2 84B requesting authorization. The SDN policy agent can also probe A6 and the containers C1 84A and C2 84B for the hash values. Because the containers C1 84A and C2 84B come from a predefined store, containers C1 84A and C2 84B will have the passwords configured already. The requesting containers C1 84A and C2 84B will reply A7 back to the policy container with the hash, and the policy container will approve the authenticity of containers VMs C1 84A and C2 84B. Then, the determination as to whether to allow the particular containers C1 84A and C2 84B to access the communications port 82 is made based on a comparison of the hashed password with the policy information 88.

Referring again to FIG. 4 in conjunction with FIGS. 7 and 8, connection establisher 96 of system 72, as executed by computer system/server 12, is configured to establish the connection between the requesting containers C1 84A and C2 84B and SDN controller 310 in response to a determination that the containers C1 84A and C2 84B are eligible. SDN policy agent 86 acts to establish the connection. In an embodiment, in response to the forwarding of a correct hash SDN policy agent 86, and SDN policy agent 86 will approve the authenticity of these containers C1 84A and C2 84B to SDN controller 310, allowing the requesting containers C1

84A and C2 84B to establish the connection. If any of the requesting containers C1 84A and C2 84B fails to provide the correct hash SDN to policy agent 86, SDN policy agent 86 will mark those containers VMs C1 84A and C2 84B to SDN Controller 310, and the unauthenticated containers C1 84A and C2 84B will not become part of SDN networks.

Figure 9:
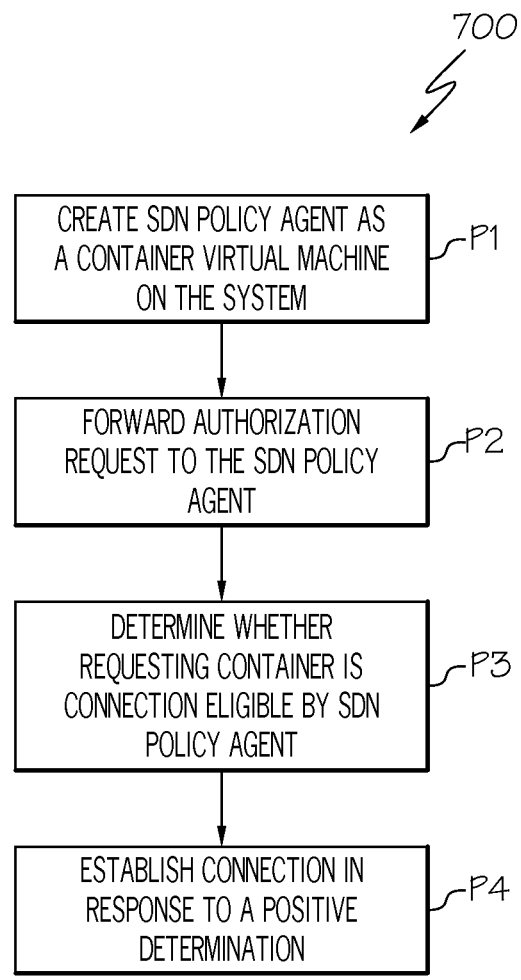
FIG. 9 depicts an example process flowchart according to an embodiment of the present invention.

Referring now to FIG. 9 in conjunction with FIG. 4, a process flowchart according to an embodiment of the present invention is shown. At P1, policy agent creator 90 of system 72, as executed by computer system/server 12, creates a SDN policy agent 86 as a container 84A-N in the container-based networked computing environment. SDN policy agent 86 is dedicated to provide SDN communications to other containers 84A-N in the container-based networked computing environment. At P2, communication request redirector 92 forwards an authentication request by a container 84A-N to establish a SDN connection with a SDN controller 310 to the SDN policy agent 86. At P3, container authenticator 94, determines, by the SDN policy agent 86, whether the container is eligible to establish the connection. At P4, connection establisher 96 of system 72, as executed by computer system/server 12, establishes, by the SDN policy agent 86, the connection between the container and the SDN controller in response to a determination that the VM is eligible.

The process flowchart of FIG. 9 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for facilitating a software-defined networking (SDN) communication in a container-based networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for facilitating an SDN communication. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for facilitating an SDN communication in a container-based networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for responding to a threat in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for facilitating a software-defined networking (SDN) communication in a container-based networked computing environment, comprising:

creating a SDN policy agent in the container-based networked computing environment, the SDN policy agent being a container virtual machine (VM) that is dedicated for providing SDN communications to other container VMs in the container-based networked computing environment, the SDN policy agent and of the other container VMs being VM instances that are based upon a software abstraction layer and run on a common operating system that runs on a single physical machine in the container-based networked computing environment;

inserting, in response to the creating of the SDN policy agent, an address corresponding to the SDN policy agent into a kernel of an operating system of the container-based networked computing environment using a hosting utility;

forwarding, in response to a request by a container of the other container VMs in the container-based networked computing environment to establish a SDN connection with a SDN controller, an authentication request to the SDN policy agent;

accessing, in response to the request, the kernel by the SDN controller to retrieve the address using the hosting utility;

determining, by the SDN policy agent, whether the container is eligible to establish the connection; and establishing, by the SDN policy agent, the connection between the container and the SDN controller in response to a determination that the VM is eligible.

2. The method of claim 1, further comprising:
setting, prior to the creating of the SDN policy agent, a default address for the SDN policy agent in a virtual switch of an operating system of the container-based networked computing environment;

establishing, during the creating of the SDN policy agent, a location of the SDN policy agent to be the default address; and accessing, in response to the request, the virtual switch by the SDN controller to retrieve the address.

3. The method of claim 1, further comprising:
forwarding, in response to the request by the container, a challenge packet in the request to the SDN policy agent by the SDN controller;

hashing, by the SDN policy agent, the challenge packet to obtain a password; and performing the determining based on the password.

4. The method of claim 1, further comprising, marking, in response to a determination that the container is not eligible to establish the connection, the container to the SDN controller.

5. The method of claim 1, wherein the networked computing environment is a cloud computing environment and wherein the container is a cloud resource.

6. A system for facilitating a software-defined networking (SDN) communication, comprising:
a physical server having an operating system;
a plurality of containers running on the physical server, each container of the plurality of containers being a virtual machine (VM) running on the operating system;
a communications port that connects the physical server to a network;
a SDN controller, configured to:
insert, in response to the creating of a SDN policy agent, an address corresponding to the SDN policy agent into a kernel of an operating system of the container-based networked computing environment using a hosting utility;
forward, in response to a request by a VM in one of the plurality of containers to establish a connection with the SDN controller, an authentication request;
access, in response to the request, the kernel to retrieve the address using the hosting utility; and
provide, in response to the authentication request being approved, a virtualized network connection between the VM and the communications port; and the SDN policy agent, the SDN policy agent being a container virtual machine (VM) that is dedicated for providing SDN communications to other container VMs comprising the plurality of containers on the physical server, the SDN policy agent and of the other container VMs being VM instances that are based upon a software abstraction layer and run on a common operating system that runs on a single physical machine in the container-based networked computing environment, the SDN policy agent being configured to:
obtain the authentication request sent by the SDN controller;
determine whether the VM is eligible to establish the connection; and
establish the connection between the VM and the SDN controller in response to a determination that the VM is eligible.

7. The system of claim 6, further comprising:
setting, prior to the creating of the SDN policy agent, a default address for the SDN policy agent in a virtual switch of an operating system of the container-based networked computing environment;

establishing, during the creating of the SDN policy agent, a location of the SDN policy agent to be the default address; and accessing, in response to the request, the virtual switch by the SDN controller to retrieve the address.

8. The system of claim 6, further comprising:
forwarding, in response to the request by the container, a challenge packet in the request to the SDN policy agent by the SDN controller;

hashing, by the SDN policy agent, the challenge packet to obtain a password; and performing the determining based on the password.

9. The system of claim 6, further comprising, marking, in response to a determination that the container is not eligible to establish the connection, the container to the SDN controller.

10. The system of claim 6, wherein the networked computing environment is a cloud computing environment and wherein the container is a cloud resource.

11. A computer program product embodied in a computer readable medium that, when executed by a computer device, performs a method for facilitating a software-defined networking (SDN) communication in a container-based networked computing environment, the method comprising:
creating a SDN policy agent in the container-based networked computing environment, the SDN policy agent being a container virtual machine (VM) that is dedicated for providing SDN communications to other container VMs in the container-based networked computing environment, the SDN policy agent and of the other container VMs being VM instances that are based upon a software abstraction layer and run on a common operating system that runs on a single physical machine in the container-based networked computing environment;

insert, in response to the creating of the SDN policy agent, an address corresponding to the SDN policy agent into a kernel of an operating system of the container-based networked computing environment using a hosting utility;

forwarding, in response to a request by a VM of the other container VMs in the container-based networked computing environment to establish a SDN connection with a SDN controller, an authentication request to the SDN policy agent;

access, in response to the request, the kernel by the SDN controller to retrieve the address using the hosting utility;

determining, by the SDN policy agent, whether the VM is eligible to establish the connection; and establishing, by the SDN policy agent, the connection between the VM and the SDN controller in response to a determination that the VM is eligible.

12. The program product of claim 11, the method further comprising:

setting, prior to the creating of the SDN policy agent, a default address for the SDN policy agent in a virtual switch of an operating system of the container-based networked computing environment;

establishing, during the creating of the SDN policy agent, a location of the SDN policy agent to be the default address; and accessing, in response to the request, the virtual switch by the SDN controller to retrieve the address.

13. The program product of claim 11, the method further comprising:

forwarding, in response to the request by the container, a challenge packet in the request to the SDN policy agent by the SDN controller;

hashing, by the SDN policy agent, the challenge packet to obtain a password; and performing the determining based on the password.

14. The program product of claim 11, the method further comprising, marking, in response to a determination that the container is not eligible to establish the connection, the container to the SDN controller.

15. The program product of claim 11, wherein the networked computing environment is a cloud computing environment and wherein the container is a cloud resource.

* * * * *